United States Patent Office 3,477,239
Patented Nov. 11, 1969

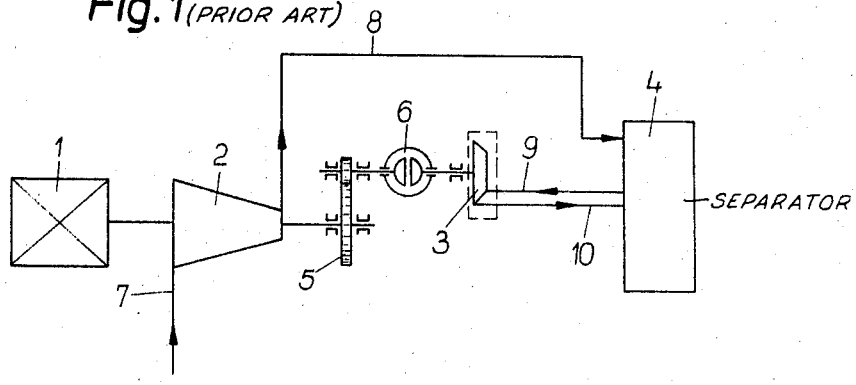
Fig. 1 (PRIOR ART)
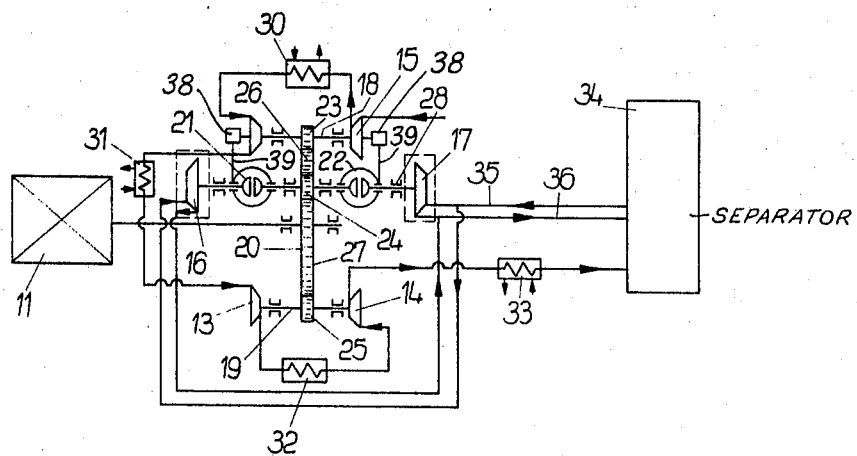
Fig. 2 (INVENTION)

3,477,239
MULTISTAGE COMPRESSION DRIVE IN GAS SEPARATION
Ernst A. Rische, Duisburg-Rahm, Germany, assignor to Messer Griesheim G.m.b.H., Frankfurt am Main, Germany, a corporation of Germany
Filed May 16, 1967, Ser. No. 638,916
Int. Cl. F25j 3/00; F25d 9/00
U.S. Cl. 62—38     1 Claim

ABSTRACT OF THE DISCLOSURE

In apparatus for separating a compressed gaseous mixture, the expansion supplies energy to a gear train for the multistage compressor. The gear train progressively subdivides the power in halves down to the individual compression stages.

Background of the invention

The present invention relates to a method and apparatus for operating gas separation equipment and more particularly to a method and apparatus wherein the compression of a gas to be separated and the expansion of the compressed gas are carried out simultaneously for refrigeration purposes.

In gas separation plants, particularly air separation plants, in many instances the gas mixture to be separated is initially compressed and the compressed gas then expanded in expansion machines. The cold resulting from the expansion of the compressed gas is needed for covering the cold loss of the separation apparatus and for producing condensed low-temperature gases.

For large separation plants, compressors and expansion machines are usually constructed as high speed rotary machines, for example, jet engines or machines with rotating displacers. In many instances the energy developed in the expansion of the gas is utilized in that the expansion machine drives a generator or compressor which compresses the gas.

Prior to the present invention a relatively expensive gear was necessary to drive the compressor with the energy developed by the expansion machine. This complex gear was needed in order to step down from the high rate of revolutions of the expansion machine to the rate required by the generator. Furthermore, in some instances the electric power received by the generator or compressor is relatively low and in many instances this power has no relationship to the input required for driving the compressor. Particularly, an emergency governor must be provided to prevent the gas stream from flowing into the expansion machine during failure of the compressor to thereby avoid an undue high revolution rate. In the past, driving the compressor with the expansion machine depended upon the working order of the expansion machine and the energy required fluctuated constantly.

Systems are known wherein the compressor is driven by an electric motor, turbine or the like and wherein between the driving motor and the compressor a gear is provided to step up from the relatively low revolution rate of the motor to the somewhat higher revolution rate of the compressor. The expansion machine is likewise provided with a gear to decrease its rate of revolutions to that of the compressor. In reciprocating engines compressor and expansion machines operate on a common crankshaft where the energy of the expansion machine is used to drive the compressor.

Accordingly, it is an object of the present invention to provide for refrigeration purposes a novel method and apparatus for operating gas separation equipment.

Summary of the invention

In accordance with the present invention, in gas separation equipment, mechanical energy developed by an expansion machine is introduced directly into a gear between a compressor and the driving motor for that compressor. In this manner the energy developed by the expansion machine is utilized to drive the compressor in a high efficient and economical manner. Special gearing is not required and instead a simple transmission arrangement is provided to transmit the energy from the expansion device to the compressor. This arrangement includes a spur gear connected to the shaft of the expansion machine and this gear is in driving engagement with a planetary gear assembly located between the driving motor and the compressor.

The invention has the advantage that without additional gearing the conduction of energy into the compressor is possible, and thus the use of a generator, electrical suppressor or the like is not needed to dissipate the mechanical expansion energy. In multishafted compressors which have gearing anyway, only additional driving shafts with transmission elements in the gearing are necessary. In order to stop the expansion machine for repair or for melting frozen deposits, while the compressor is running, there is suitably provided a coupling between the compressor or the compressor gearing and the expansion machine. This can be constructed, for example, as a hydraulic coupling according to Foettinger where the coupling is connected to the lubricating oil pumping system of the compressor.

The machine unit consisting of the compressor and expansion machine should be mounted as near to the separation apparatus as possible in order to keep down the cold loss from supply and outlet pipes as much as possible. Furthermore, the conduits should be extensively protected from penetration of the surrounding warmth with insulation.

Brief description of the drawing

Novel features and advantages of the present invention in addition to those mentioned above will become apparent to one skilled in the art from a reading of the following detailed description in conjunction with the accompanying drawings wherein similar reference characters refer to similar parts and in which:

FIGURE 1 is a diagrammatic view of known gas separation equipment; and

FIGURE 2 is a diagrammatic view of gas separation equipment according to the present invention.

Detailed description of the invention

Referring in more particularity to the drawing, FIGURE 1 illustrates diagrammatically a known gas separation plant having a compressor 2 and a motor 1 for driving the compressor. An expansion machine 3 is also provided as well as gas separation apparatus 4. A gear 5 and a coupling 6 are provided between the compressor and the expansion machine for connecting these components together.

In operation, the driving motor 1 operates the compressor 2 whereby gas drawn through a conduit 7 is compressed and fed out of the compressor into separation apparatus 4 through a conduit 8. Gear 5 by way of coupling 6 produces the connection of the compressor to the expansion machine. The gas to be expanded comes from the separation apparatus 4 by way of an insulated conduit 9 and then flows back to apparatus 4 through the insulated conduit 10.

FIGURE 2 diagrammatically illustrates the novel apparatus of the present invention wherein a two-shaft compressor has compression steps 12, 13, 14 and 15 connected in pairs on shafts 18 and 19. An expansion machine having a pair of steps 16 and 17 is in driving relationship with the compressor steps by means of couplings 21 and 22, and a planetary gear train composed of spur gears 23, 24, 25, 26 and 27. Gas coolers 30, 31, 32 are arranged between the individual compression steps, and behind the fourth step a cooler 33 is arranged from which the gas flows into the separation apparatus 34.

A motor 11 is provided for operating the four compression wheels of the compression steps 12–15 and power is transmitted to the compression steps from the motor through the planetary gear train. The compression steps are also driven by the mechanical energy developed in the steps 16 and 17 of the expansion machine. In this regard, the shaft 28 transfers energy from the expansion machine to the planetary gear train through the couplings 21 and 22. The gas to be expanded flows through the insulated conduit 35 from the separation apparatus 34 to the steps 16 and 17 of the expansion machine. The expanded gas returns to the separation apparatus 34 through insulated conduit 36.

Moreover, the couplings 21, 22 may be of the hydraulic type and the compressor may include a lubricating oil pump with the oil serving as hydraulic fluid for operating the couplings.

In this regard, the compressor steps 12 and 15 have lubricating oil pumps 38 connected by conduits 39 to the couplings 21, 22.

What is claimed is:
1. An apparatus for operating gas separation equipment for refrigeration purposes comprising a multistage compressor for compressing a gas mixture having at least four compression stages, a motor connected to drive the compressor stages, gearing means between the motor and compressor stages to progressively subdivide the power take-off in halves down to the individual compressors, a separator for separating a desired gas component from the compressed mixture, a network for delivering the compressed gas mixture from the compressor stages to the separator, and at least two expansion means drivingly connected to the gearing and delivering power to the gearing means at the point at which the motor delivers power thereto to expand the separated gas component of the compressed gas mixture in parallel whereby the energy developed by the multistage expansion means is utilized to assist the motor in operating the compressor stages, hydraulic couplings for disengaging the stages of the expansion means from their driving relationship with the gearing and wherein the multistage compressor has lubricating oil pumps and the oil serves as hydraulic fluid for operating the couplings.

References Cited
UNITED STATES PATENTS

| | | | |
|---|---|---|---|
| 1,440,000 | 12/1922 | Bonine | 62—402 |
| 1,571,461 | 2/1926 | Van Nuys | 62—39 XR |
| 1,989,636 | 1/1935 | Edwards | 62—38 XR |
| 2,009,001 | 7/1935 | Peterson | 230—15 XR |
| 2,425,885 | 8/1947 | Jennings. | |
| 2,557,099 | 6/1951 | Green | 62—402 |
| 3,103,427 | 9/1963 | Jennings | 62—39 |
| 3,194,026 | 7/1965 | La Fleur | 62—38 XR |
| 3,261,168 | 7/1966 | Ruhemann | 62—38 XR |
| 3,348,384 | 10/1967 | Harmens | 62—38 XR |

NORMAN YUDKOFF, Primary Examiner

U.S. Cl. X.R.
62—401